United States Patent
Leong et al.

(10) Patent No.: US 6,687,018 B1
(45) Date of Patent: *Feb. 3, 2004

(54) SYSTEM AND METHOD FOR DISTRIBUTING PRINT JOBS

(75) Inventors: Gilbert Kwock Keong Leong, La Canada-Flintridge, CA (US); Larry Dean Bonham, Sunnyvale, CA (US); David P. Nesbitt, Redondo Beach, CA (US); Leslie B. Nesbitt, Redondo Beach, CA (US)

(73) Assignee: Xerox Corporation, Stamford, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/966,404

(22) Filed: Nov. 7, 1997

(51) Int. Cl.[7] .............................................. G06K 15/00
(52) U.S. Cl. ...................................... 358/1.15; 358/1.1
(58) Field of Search ................................ 395/114, 112, 395/110, 101, 115; 358/402, 403, 407, 468, 1.15, 1.13, 1.11, 1.1, 1.14, 1.16

(56) References Cited

U.S. PATENT DOCUMENTS

| | | | | |
|---|---|---|---|---|
| 5,179,637 A | * | 1/1993 | Nardozzi | ..................... 395/114 |
| 5,220,674 A | * | 6/1993 | Morgan et al. | .............. 395/110 |
| 5,287,194 A | * | 2/1994 | Lobiondo | .................... 395/114 |
| 5,467,434 A | * | 11/1995 | Hower, Jr. et al. | .......... 395/114 |
| 5,559,933 A | * | 9/1996 | Boswell | ........................ 395/114 |
| 5,625,757 A | | 4/1997 | Kageyama et al. | ......... 358/1.14 |
| 5,987,226 A | * | 11/1999 | Ishikawa et al. | ............ 358/1.13 |
| 5,995,721 A | * | 11/1999 | Rourke et al. | ............. 358/1.15 |
| 6,213,652 B1 | * | 4/2001 | Suzuki et al. | .............. 358/1.15 |

* cited by examiner

*Primary Examiner*—Gabriel Garcia
(74) *Attorney, Agent, or Firm*—Oliff & Berridge, PLC

(57) ABSTRACT

A printing system for distributing print requests submitted by one or more clients includes a server that receives the print requests, generates a print job from one or more print requests, and extracts attributes of the print job. A database contains attributes of the logical printers and physical printers associated with the logical printers, the queues of a network and the attributes of the print job received from the clients. A database query is used to filter the attributes extracted from a print job against the attributes of the physical printers associated with the logical printer to which the print job was sent to determine whether the print job is printable by at least one of the associated physical printers. A queue stores print jobs that are determined to be acceptable. Each printer is capable of notifying the server when it is idle. A second database query, based on the attributes of an available physical printer, is used to filter against the attributes of the available printer against the attributes of the printable jobs in the associated queue, to determine which available jobs are printable on the available printer. One of the determined printable jobs is then output to the available physical printer.

32 Claims, 9 Drawing Sheets

SYSTEM AND METHOD FOR DISTRIBUTING PRINT JOBS

BACKGROUND OF THE INVENTION

1. Field of the Invention

This invention relates generally to a print system and method for managing the printing of jobs on a network.

In particular, this invention is directed to a method of validating the receipt of print jobs submitted by one or more clients and the allocation of the jobs to the first available printer that is capable of printing the print job.

2. Description of the Related Art

As shown in FIG. 1, the basic conventional printing system 10 uses a client/server architecture that includes three primary components: a client 20, a server 40, and an output device 50. The client 20 conveys print and management requests to the server 40 and receives responses from the server 40 that arise in response to the submitted requests.

The server 40 receives these requests from the client 20, performs the required actions for each request, and returns the responses to the client 20. One such request from a client is a print request, i.e., a request to print one or more copies of one or more documents, with the printed pages output using one or more features. The features can include simplex or duplex printing, stapling or binding, and the like. Thus, a print request represents a collection of one or more documents to be printed, as well as instructions for printing. The server 40 organizes the documents indicated in the print request submitted by the client into a print job. The server then sends the print job and any associated job control commands to the output device 50.

The output device 50 is a physical device, or hardware, that is capable of rendering images of documents and producing hard copy output of the print jobs received from the server 40. The output device 50 can then return responses to the server 40 regarding its current state or the status of the received print jobs. The output device 50 is commonly a printer.

In conventional document printing systems, a user must specify the physical printer to be used to print a specific job or print a document. Therefore, the user must know the attributes of every available physical printer on the network in order to decide which printer would best print the desired document(s).

Once a print request is submitted by the user, the corresponding print job will wait until the specified printer is available for printing. If the specified printer has multiple print jobs waiting to be printed, there is no way for the conventional document printing system to re-direct one or more of the waiting print jobs to other available printers capable of printing one or more of those jobs. Additionally, if new printers are added to the network, each user must ascertain the capabilities of each new printer and the print address for each newly added printer, assuming the user even knows that new printers have been added. Thus, newly added printers can be available for quite some time without being used at their full capacity.

While the management of print jobs for the system shown in FIG. 1 is straightforward, other existing print systems are quite complicated. A more sophisticated print system exists, as described with reference to FIGS. 2 and 3. The more sophisticated print system addresses the situation where a user submits a print request to a single printer or a logical printer but the output can be generated by one of more physical printers. In this configuration, the user does not need to know the existence of every physical printer in the system. Also, a user does not want to submit a job to a printer if the request cannot be satisfied by the output device. In this case, the user will want the system to reject the request.

In this configuration, a logical printer represents the print characteristics of one of more physical printers. However, the representation of all of the associated physical printer characteristics through the logical printer may create an erroneous representation, because a print request may contain characteristics spread amongst the multiple printers but no single physical printer provides the entire support for the print request.

In this type of print system, there are two problems that need to be addressed. One of the issues is validating the acceptance of the print jobs submitted from the client, specifically, verifying that the print requirements of the print job are satisfied by the logical printer and determining if the job can be printed by one of the physical printers associated with the logical printer. The second issue that needs to be addressed is how the server may later determine which physical printer is capable of printing this print job. This second issue is referred to as job scheduling. To complicate matters, all the physical printers connected to the printing system may have multiple, and dynamically varying, capabilities. As a result, determining whether the print system will accept the print job and later determining which physical printer may print the job are complicated problems. This invention solves these two problems, as will be discussed later.

For convenience and understanding, the following definitions are provided. It can be appreciated that the term spooler refers to an entity where jobs are received from the client, and where job validation, scheduling, and management occurs. A supervisor is an entity where jobs are received from the spooler and sent to the output devices such as printers. A logical printer is a representation of the characteristics of one or more associated physical printers. A physical printer is a representation of the output device. A queue serves as a holding tank for submitted jobs. A queue also contains the association between the logical printers and the associated physical printers. Finally, a client is an entity from which jobs are submitted. Attributes is a term that is used synonymously to reference the characteristics of print jobs, documents, logical printers, and physical printers.

SUMMARY OF THE INVENTION

This invention provides a print system apparatus and method for efficiently distributing printing functions in a networked computing environment.

The printing system of the invention includes one or more clients, where each client can submit print requests; a server that receives the print requests, extracts the printing requirements of the print requests (e.g. stapling, two sided printing, 8.5×11 sheets), generates print jobs from the print requests, and stores the print job requirements in a database; a database that contains attributes of the logical printers, attributes of the physical printers of a network, and attributes of the print jobs; a queue that stores print jobs that are printable on at least one network printer; and at least one printer that notifies the server when it is idle or ready to print another print job.

The method of this invention resolves the handling of print requests during the job acceptance phase and the job scheduling phase. The job acceptance phase includes receiving print requests from the requester, extracting print requirements as attributes, generating print jobs from the print requests and storing the print job attributes into a database, generating a database query based on the print job attributes, and using the query to determine whether the print job is printable by one or more of the associated physical printers. Once the job is accepted, it is stored in a queue, and a database query based on a waiting physical printer's attributes for each waiting printer is generated to determine if the job can be printed on one of the waiting printers. Also when a physical printer requests a job to print, a database query based on the attributes of the waiting physical printer is generated and used to determine which available print jobs are printable on the available printer. One of the printable print jobs is then submitted to the waiting physical printer. The previous two descriptions are actions done during the job scheduling phase.

These and other features and advantages of this invention are described in or apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF THE PREFERRED EMBODIMENTS

Figure 1:
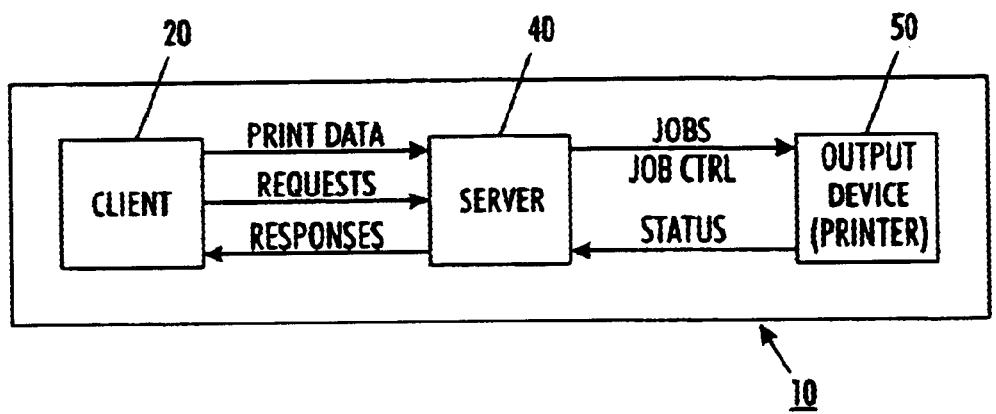
FIG. 1 is a block diagram of a conventional printing system.
Figure 2:
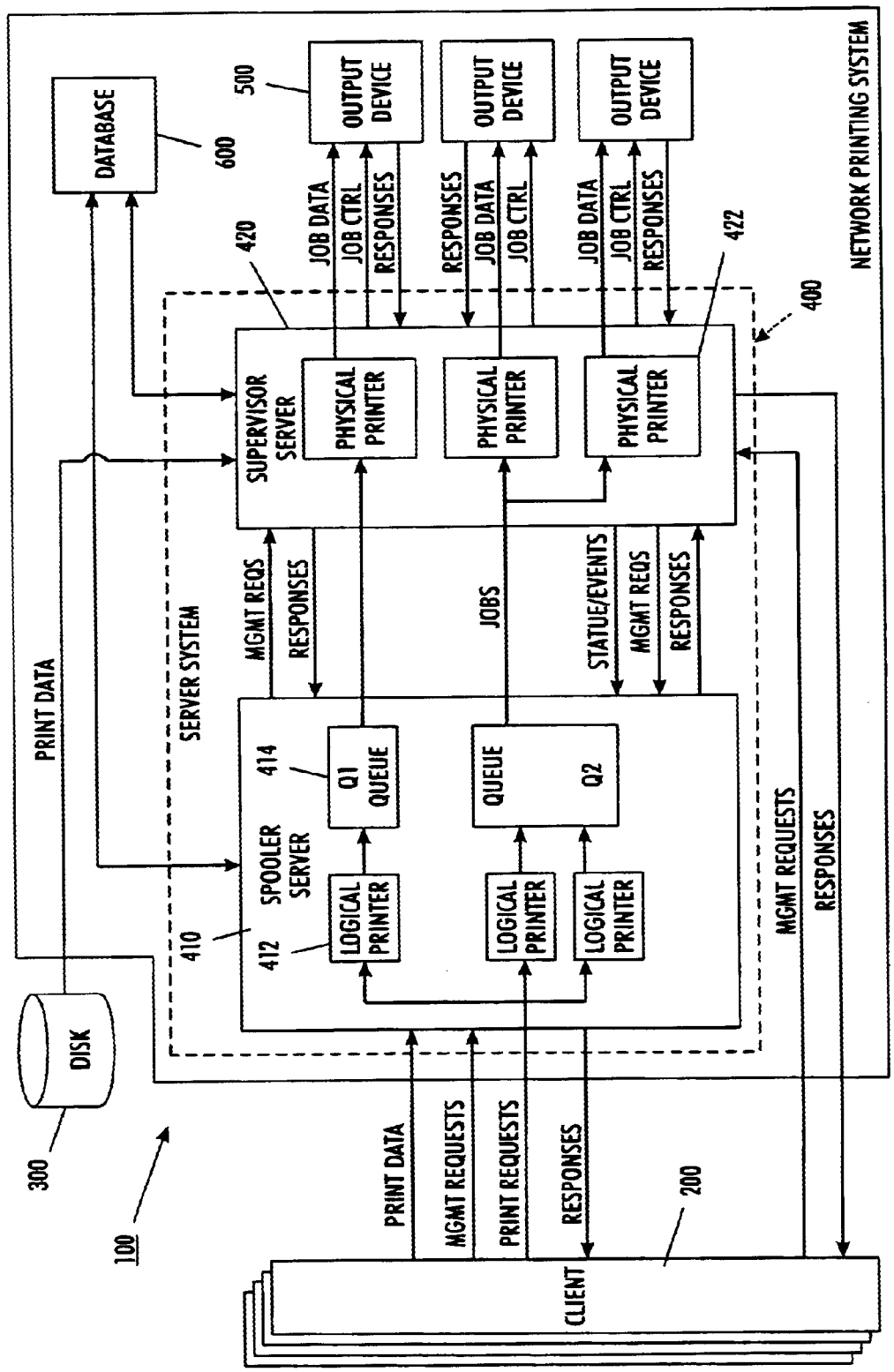
FIG. 2 is a block diagram of a simplified version of a complex printing system.

The printing system of this invention expands on the conventional system by using a server system rather than a single server; however, the invention can be practiced on a system having a single server. As shown in FIG. 2, the printing system 100 can be implemented on a general purpose computer 400.

The printing system 100 of this invention uses two different abstractions to indicate the characteristics of the multiple output devices 500 that it can support. Performance characteristics that may be requested by a client 200 in a print job and based on characteristics of the associated physical printers are used to configure one or more logical printers 412. One or more queues 414 are then used to associate the logical printers 412 to one or more various physical printers 422.

The server system 400 of the network printing system divides its functions between two different server types, a spooler 410 and a supervisor 420. In a preferred embodiment of the present invention, the server system resides on a general purpose computer. The spooler 410 receives print requests from one or more clients 200, either directly or via any other source of print requests, such as a storage disk 300. The print requests include print data for one or more documents as well as printing instructions, i.e., simplex or duplex printing, stapling or binding, multiple copies, etc. The spooler 410 can also receive client management requests that apply to the spooler 410 or to spooler elements, which include the logical printers 412, queues 414 and print jobs. The spooler 410 converts the print requests into print jobs.

The supervisor 420 delivers data to the various output devices 500. The supervisor 420 receives the print jobs from the spooler 410, interprets the print jobs for print instructions and parameters, passes the print data, instructions and parameters to the appropriate output device 500, and handles any responses made by the output device 500. Multiple supervisors 420 can be supported by a single spooler 410. The supervisor 420 can also receive client management requests that apply to the supervisor 420 or to supervisor elements, which include the physical printers 422.

A logical printer 412 indicates particular characteristics and capabilities of one or more of it associated physical printers 422. The logical printers 412 are an abstraction of the printer capability of the network printing system 100. Each physical printer 422 represents one actual output device 500 connected to the network printing system 100. Attributes of the logical printers 412 and the physical printers 422 are stored on a database 600 associated with the network printing system 100. The printer attributes correspond to the print job attributes that are extracted from print requests. With regard to the print job, the attributes represent requirements of the print request. With regard to the printers, the attributes represent the print capabilities of the printers.

As a simplified example, one such attribute is directed toward "finishing" operations that may be included in a print request, such as binding or stapling. If a print request requires stapling, the finishing attribute of the print job will so indicate. Similarly, one or more physical printers of the system may be able to perform stapling. Therefore, the finishing attribute of the physical printers that can perform stapling will so indicate. In a simple example, when a physical printer capable of stapling becomes idle, the generated query will include stapling in the finishing attribute. If the idle printer can also perform binding, the finishing attribute will include both stapling and binding capabilities. When the attributes of the idle are filtered against the print job attributes by using the querying capabilities of the database, the print job will be determined to be printable on the idle printer and will be included in the list of printable print jobs.

In another simplified example, an attribute exists for describing the media size, or paper size, to be used when printing the job. If a print request requires legal-size paper, the print job attribute corresponding to media size will be set accordingly. If an idle physical printer can print on letter-size or A4 paper, its media attribute will have been set in the database, accordingly. As a result, when the query is generated based on the attributes of the idle printer and filtered against the print job attributes, the print job will not pass the filter, and thus, will remain as a pending job in the queue.

In the system of the present invention, there are many print job attributes that are specified in each print request, as well as printer attributes. In addition, a printer may be able to perform more than one type of requirement for each of its attributes. As discussed above, a printer may be able to perform stapling and binding, print on letter-size and legal-size media, print two-sided and one-sided copies, etc. In this example, the query would include attributes that are set to correspond to these capabilities.

If a query for an available printer with the previously discussed capabilities were generated, it would be queried against a pending print job. The query would compare the printer attributes with the print job attributes of pending print jobs and determine whether each print job requires printing on letter-size or legal-size paper, stapling or binding, or two-sided or one-side copies. If a print job has an attribute set to a characteristic not included in the printer attributes stored in the database, the job will not pass the query and will remain in the queue. On the other hand, if all of the print job attributes correspond to the settings of the printer attributes, the job will pass the query and be included in a list of printable jobs. In addition, if the print job does not require a particular attribute, for example, if the job does not need any finishing operation, it will also pass the filter.

These printing operations are specified only for example, and are in no way limited to those specified. The querying capabilities of the database provide the means for efficiently distributing the print jobs to available printers. The query capabilities are necessary because of the large amount of attributes that need to be compared between the print job requirements and printer capabilities. Additionally, these attributes can be dynamically changing, for instance, if a person were to remove a legal-size paper tray and insert an A4 paper tray or if a printer were to run out of staples. In these situations, the printer attributes in the database would be updated and included in subsequent queries. Likewise, the same can be applied if one modifies print job attributes.

In a preferred embodiment of this invention, the database 600 resides on the server 400. However, it can be appreciated that the database 600 does not need to reside on the server 400, but can be resident on any device that is accessible by the server 400.

Print jobs are submitted to the logical printers 422 to determine which characteristics are associated with the print job. The spooler 410 channels the print jobs via a queue 414 to the particular supervisor 420 that supports a physical printer 422 that is mapped to a logical printer 412 through the queue 414.

The queue 414 associates a set of print jobs with a set of logical printers 412 and a set of physical printers 414. The one or more queues 414 serve as a holding station for the print jobs until the spooler 410 can send them to the appropriate supervisor 420. A logical printer 412 can only be associated with one queue 414, and feeds print jobs into that one queue 414. Likewise, a physical printer 422 is associated with only one queue 414, and receives print jobs from that one queue 414. The output device is associated with one physical printer.

Figure 3:
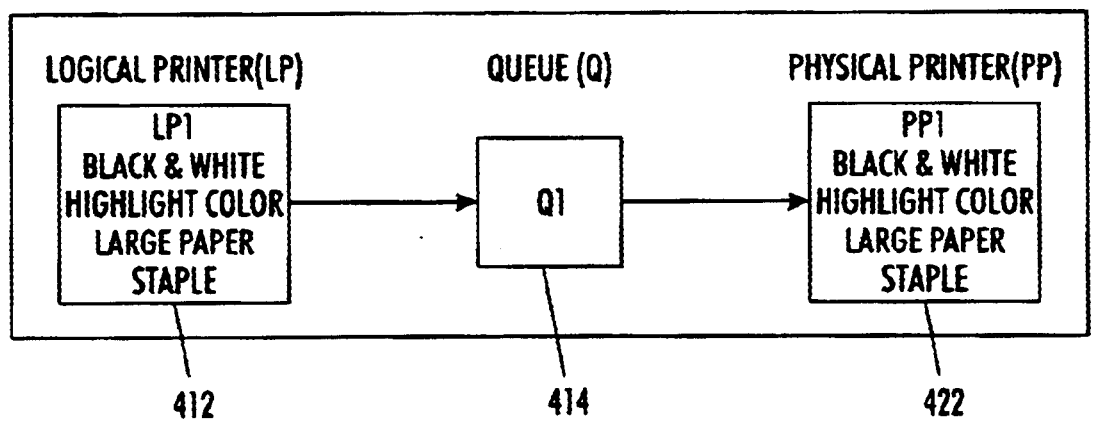
FIG. 3 is a block diagram of one physical printer and the corresponding logical printer for that physical printer.

FIG. 3 shows a simple scenario where the network printing system 100 has only one logical printer 412, one queue 414, and one physical printer 422. In this situation, the logical printer 412 serves simply as a representation of the physical printer 422.

Figure 4:
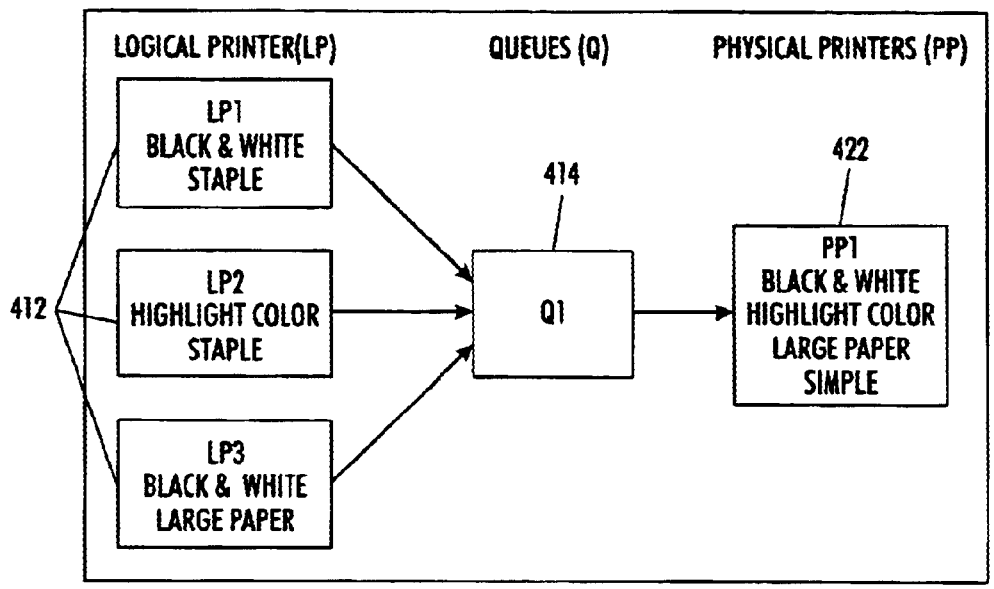
FIG. 4 is a block diagram of the physical printer of FIG. 3 and three corresponding logical printers which describe different abstractions of the physical printer.

FIG. 4 shows a situation where multiple logical printers 412 feed the queue 414 that serves only one physical printer 422. In this case, the logical printers 412 provide the clients 200 with different defaults for print requests submitted to the server 410.

Figure 5:
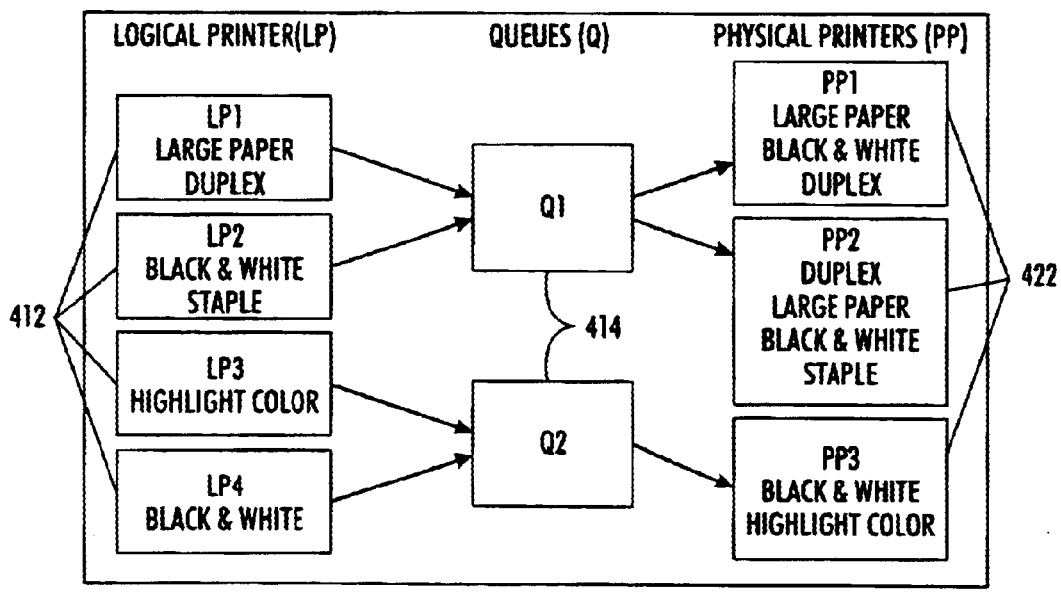
FIG. 5 is a block diagram of three physical printers and various logical printers variously corresponding to one or more of the physical printers.

FIG. 5 shows a complex case where multiple logical printers 412 and multiple physical printers 422 exist. The logical printers 412 and the queues 414 can direct print jobs to alternate physical printers 422 depending upon the characteristics of the print jobs. For example, a print job requiring output on large paper (e.g., legal-sized paper) and two-sided printing (duplex) would be submitted to logical printer 1 (LP1). A queue 1 (Q1) can then direct the print job to either a physical printer 1 (PP1) or a physical printer 2 (PP2), since both of these physical printers 422 can print on large paper and support duplex printing. Therefore, a print job requiring large paper can be printed on the first available physical printer 422 of the physical printers PP1 and PP2. In the event that there are other jobs waiting in the queue Q1, such as a print job requiring stapling, the queue Q1 can direct the print job requiring large paper to the physical printer PP1 and the print job requiring stapling to the physical printer PP2. If the print job requiring stapling finishes printing on the physical printer PP2 and the print job requiring large paper still has not yet been directed to a physical printer, the queue Q1 can then direct this print job to the physical printer PP2.

It should be appreciated that handling and distributing print jobs becomes difficult when the configuration has physical printers of dynamically varying capabilities. The logical printers, representing the capabilities of all of its associated physical printers, need to be able to validate a print job that is submitted to the logical printer. Ultimately the system must be able to find a physical printer that can meet the particular requirements of a print job in an efficient manner. This invention is directed toward using a database and its querying capabilities to solve this problem.

Also, it should be appreciated that the examples in FIGS. 2–5 only list a few physical printers and their characteristics. In reality, many printers may be present, with each printer having many characteristics, each of which may be dynamically varying. Using a database to store the print job request characteristics and printer capabilities allows the system to create dynamic queries and solves the problem of print job distribution in an efficient manner.

Figure 6:
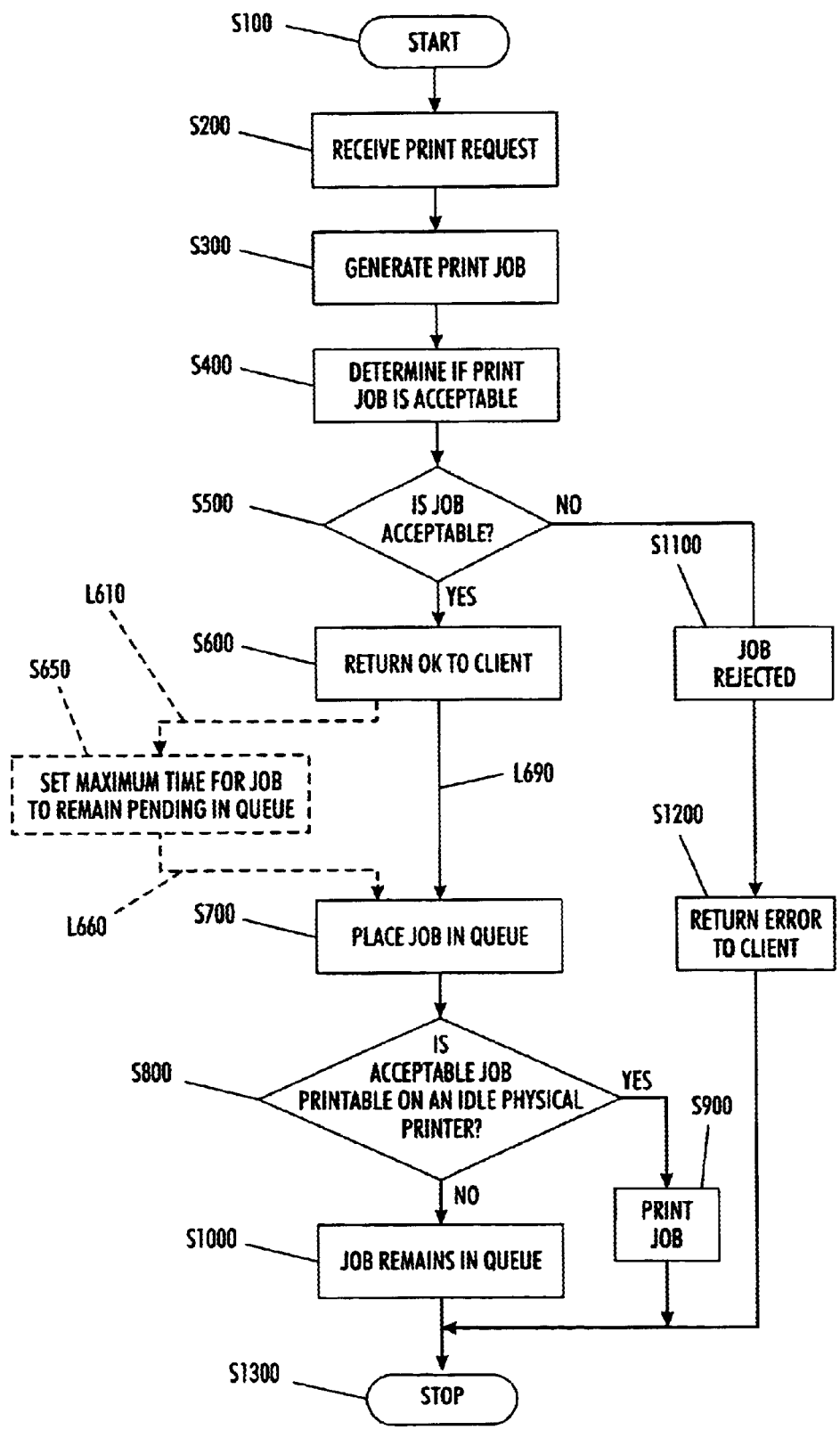
FIG. 6 is a flowchart outlining one method for placing a job into the print queue according to this invention.

FIG. 6 outlines one method for responding to a print request submitted to the network printing system 100 of this invention. Upon a print request being sent by one of the clients 200 connected to the server system 400, the control routine starts in step S100. In step S200, the print request is received by the server 410. In step S300, a print job is generated by the server 410 from the print request. Next, in step S400, the server 410 determines if the print job is acceptable by using database queries.

If the print job is acceptable for printing on the network print system, control continues to step S600. Otherwise, control jumps to step S1100

In step S600, an OK message is returned to the client 200 that generated the print request. Then, in step S700, the print job is placed into a queue 414.

Next, in step S800, the server 410 determines if the accepted print job is printable on an idle physical printer 422 associated with the queue 414 on which the job is located. An idle physical printer is a physical printer which had earlier requested a job but where no job was found for that printer. If, in step S800, the accepted print job is determined to be printable on an idle physical printer 422, control accepted continues to step S900. Otherwise, control jumps to step S1000.

In step S900, the accepted print job is printed on the idle printer. Control then jumps to step S1300, where the control routine stops. In contrast, in step S1000, the accepted print job remains in the queue, awaiting an idle physical printer that is capable of printing the job. Control then again jumps to step S1300.

As set forth above, if at step S500, the print job is not acceptable, control jumps to step S1100. In step S1100, the print job is rejected. Then, in step S1200, an ERROR is returned to the client. Control then continues to step S1300.

Figure 7:
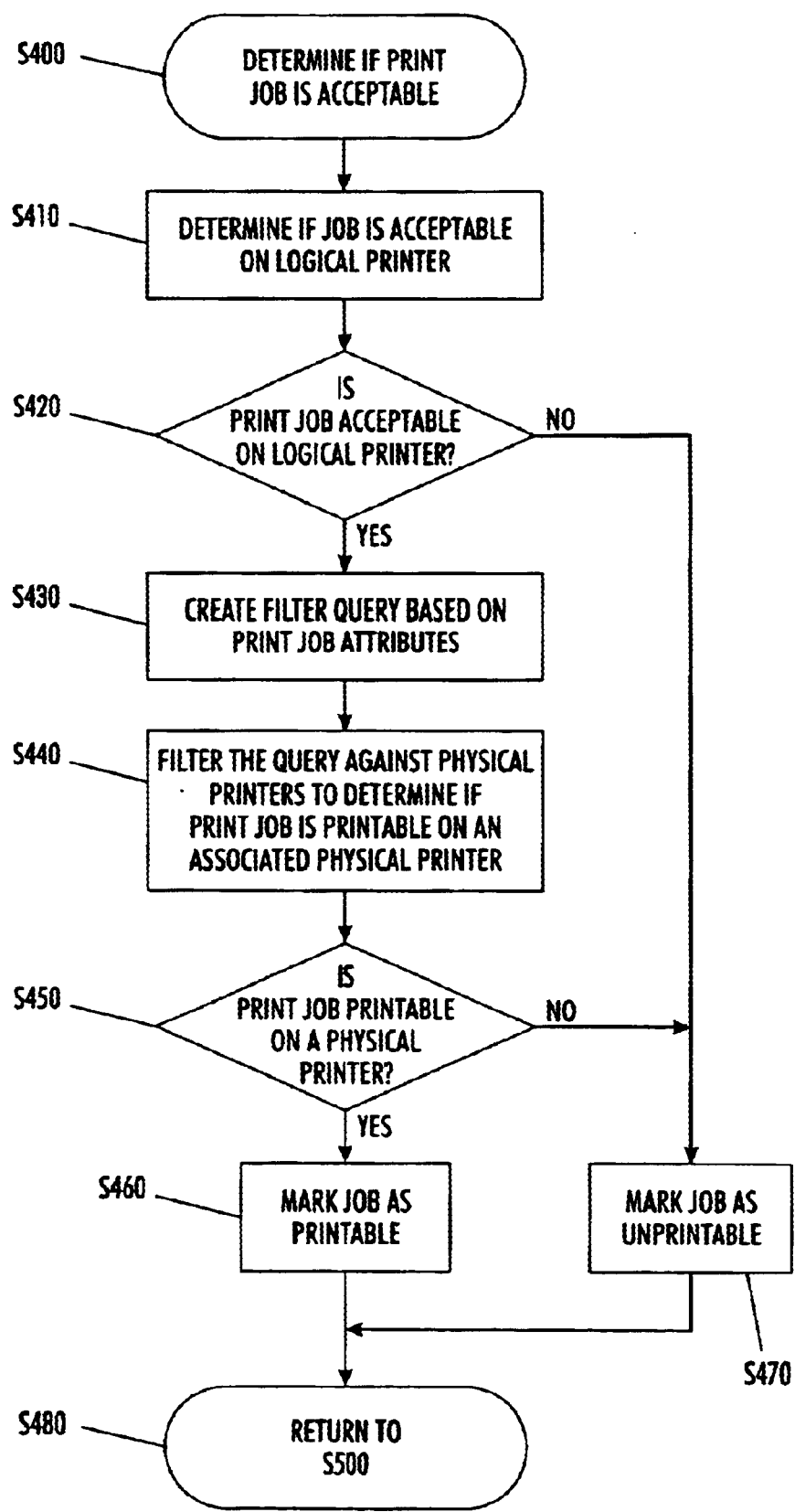
FIG. 7 is a flowchart outlining in greater detail one method for determining whether a job is printable on the print system of FIG. 2 during the job acceptance phase.

FIG. 7 outlines in greater detail the method of determining whether a print job is acceptable for printing on the network printing system of step S400. In step S410, the server determines whether the job is acceptable by the logical printer. If, in step S420, the print job is acceptable by the logical printer 412, control continues to step S430. Otherwise, control jumps to step S470.

In step S430, a database query based on the printing requirements, or attributes, of the print job is created. Then, in step S440, the query is run against the physical printers associated with the queue to determine if the print job is printable on at least one of the physical printers 422. If, in step S450, the print job is printable on at least one physical printer 422, control continues to step S460. Otherwise, control jumps to step S470. In step S460, because the print job is acceptable by the logical printer 412 and printable by at least one associated physical printer 422, the job is marked as printable. Control then jumps to step S480.

In step S470, because the print job was either unacceptable on the logical printer 412 or unprintable by any of the associated physical printers 422, the print job is marked as unprintable. Control then continues to step S480. In step S480, control is returned to step S500 in FIG. 6.

Figure 8:
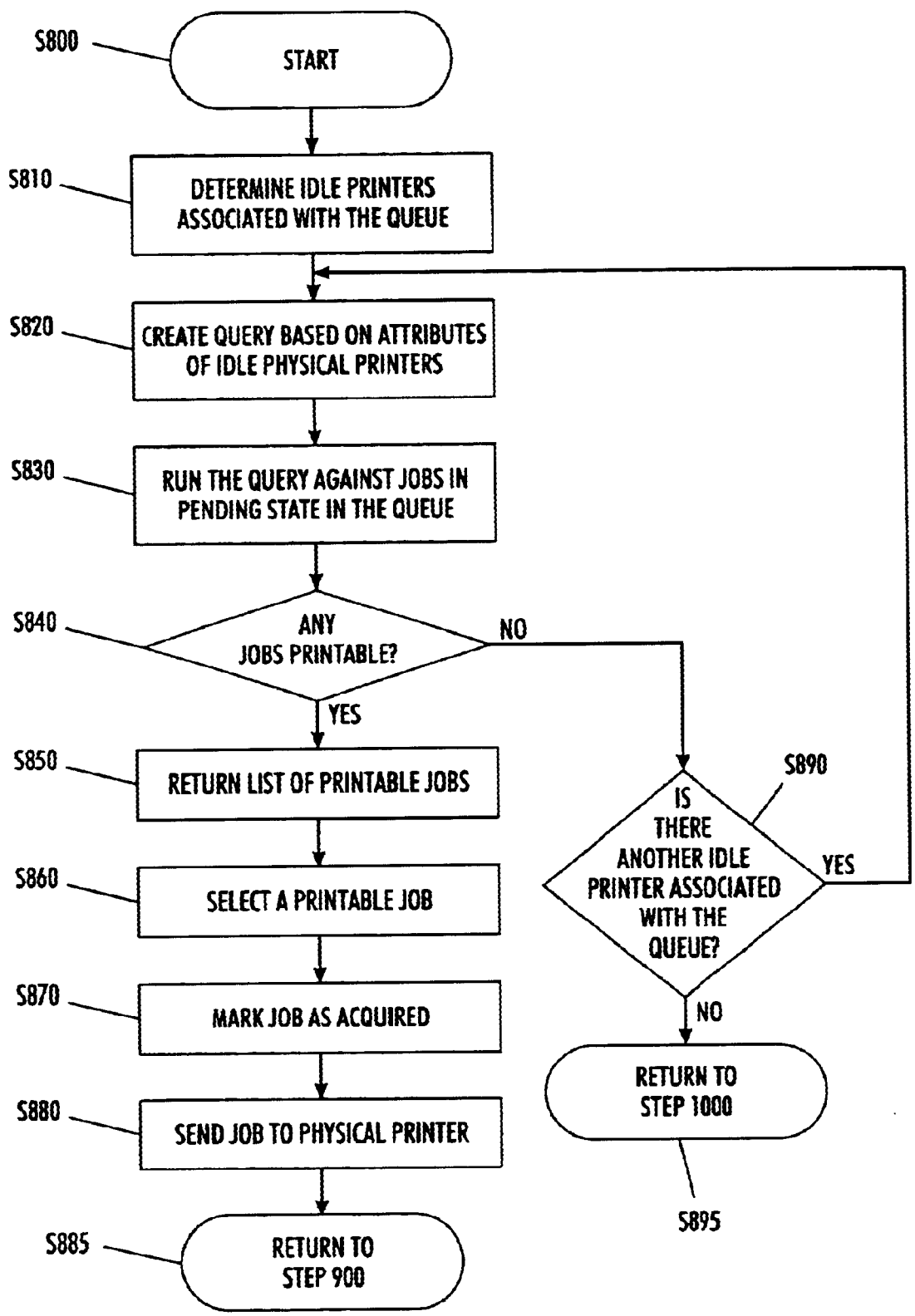
FIG. 8 is a flowchart outlining one method for selecting and outputting print jobs from the queue to an idle physical after the job is placed in the queue.

FIG. 8 outlines in greater detail the method of determining whether an accepted print job is printable on an idle physical printer of step S800. Beginning in step S800, control continues to step S810, where the idle printers associated with the queue 414 are identified. Then, it step S820, a database query is generated based upon the characteristics of the idle physical printers 422. Next, in step S830, the query is run against the pending jobs in the queue 414. An example of a query in colloquial terms is "give me all the pending jobs that want stapling, two-sided printing, and 8.5×11 paper. If, in step S840, the query returns any printable jobs, control proceeds to step S850. Otherwise, control jumps to step S890.

In step S850, a list of printable jobs is returned as a result of the database query. Next, in step S860, a printable job is selected for printing on the idle physical printer 422. Then, in step S870, the print job is marked as "acquired". Next, in step S880, the job is sent to the idle physical printer 422. Control then continues to step S885, where control returns to step S900.

If, in step S840, no jobs are printable on the idle physical printers, control jumps to step S890. In step S890, if another physical printer 422 associated with the queue 414 becomes idle, control returns to step S715. If no other physical printer 422 associated with the queue 414 is idle, control continues to step S895, where control is returned to step S1000.

Figure 9:
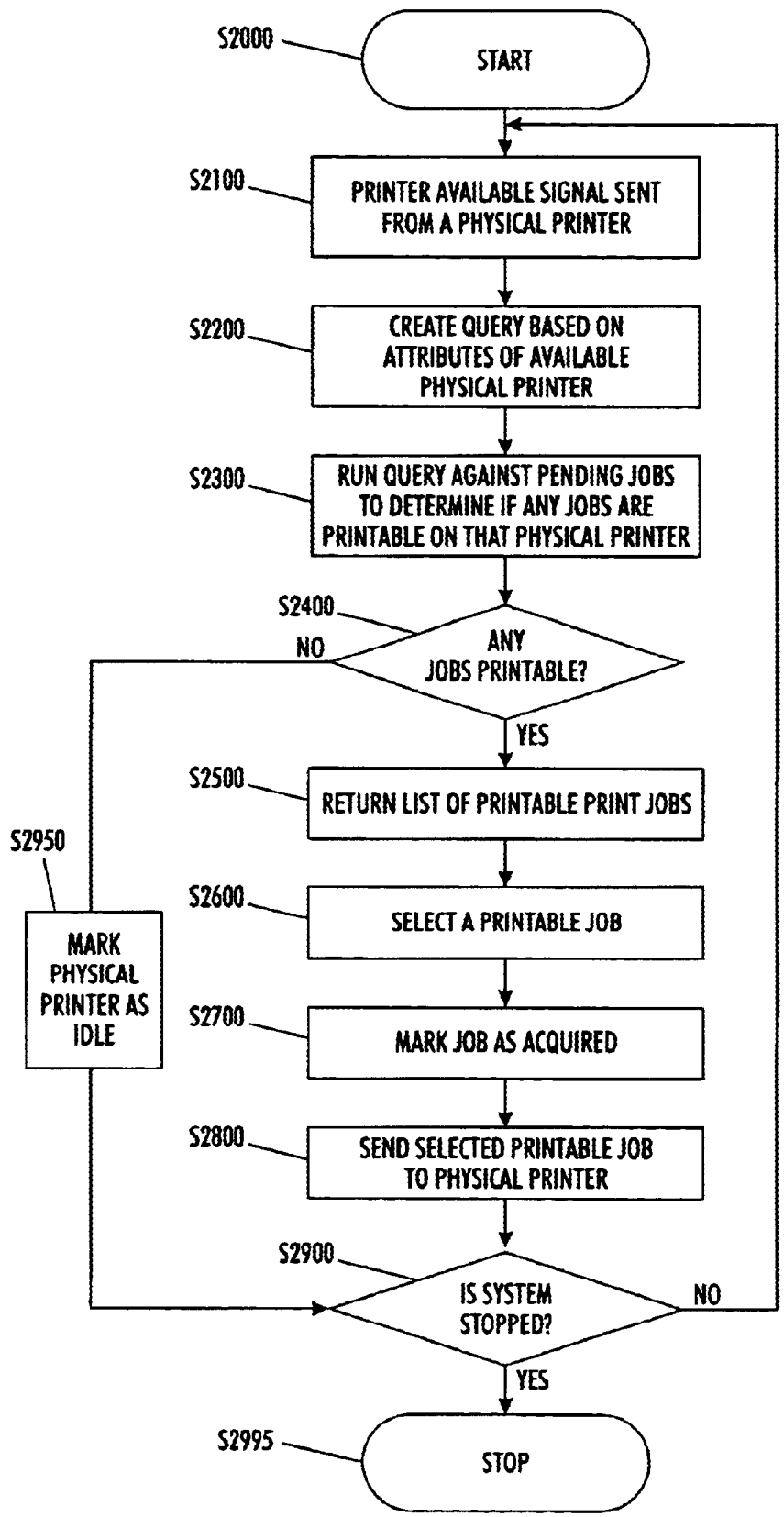
FIG. 9 is a flowchart outlining one method for selecting and outputting print jobs from the queue to an available physical printer when the physical printer requests a job.

At the same time as the print jobs are being received and evaluated as outlined in steps S100–S1300, the output devices 500 are notifying the network printing system 100 as they become available for printing. FIG. 9 outlines how the printable print jobs stored in the queues 414 are sent to an output device 500 for printing. The print system is initiated in step S2000. In step S2100, an output device 500 sends a signal notifying the network printing system 100 that it is available to receive and print a print job.

In step S2200, the network printing system 100 creates a database query based upon the characteristics of the requesting physical printer 422. A query is generated which asks which pending job's printing requirements require, or can be satisfied by, the capabilities of that physical printer. Then, in step S2300, the database query to used to determine which pending print jobs are printable on the requesting physical printer 422. If, in step S2400, any print jobs are printable on the available physical printer 422, control continues to step S2500. Otherwise, control jumps to step S2900.

In step S2500, the queue 414 returns a list of the printable print jobs. This list could be prioritized by any known method. Then, in step S2600, one of the printable print jobs is selected from the list of printable print jobs. Next, in step S2700, the job state of the selected print job is changed to "acquired" so that the job will not appear in subsequent queries. Next, in step S2800, the selected job is sent to the physical printer 422 and printed on the corresponding output device 500. Control then jumps to step S2950.

In step S2900, because no print job currently in the queue 414 is printable on the available output device 500, the corresponding physical printer 422 is marked as idle. Control then continues to step S2950.

In step S2950, if the network printing system 100 has not halted, control returns to step S2100 and the system waits for the next printer available signal. Otherwise, control continues to step S2995, where the system stops.

Figure 10:
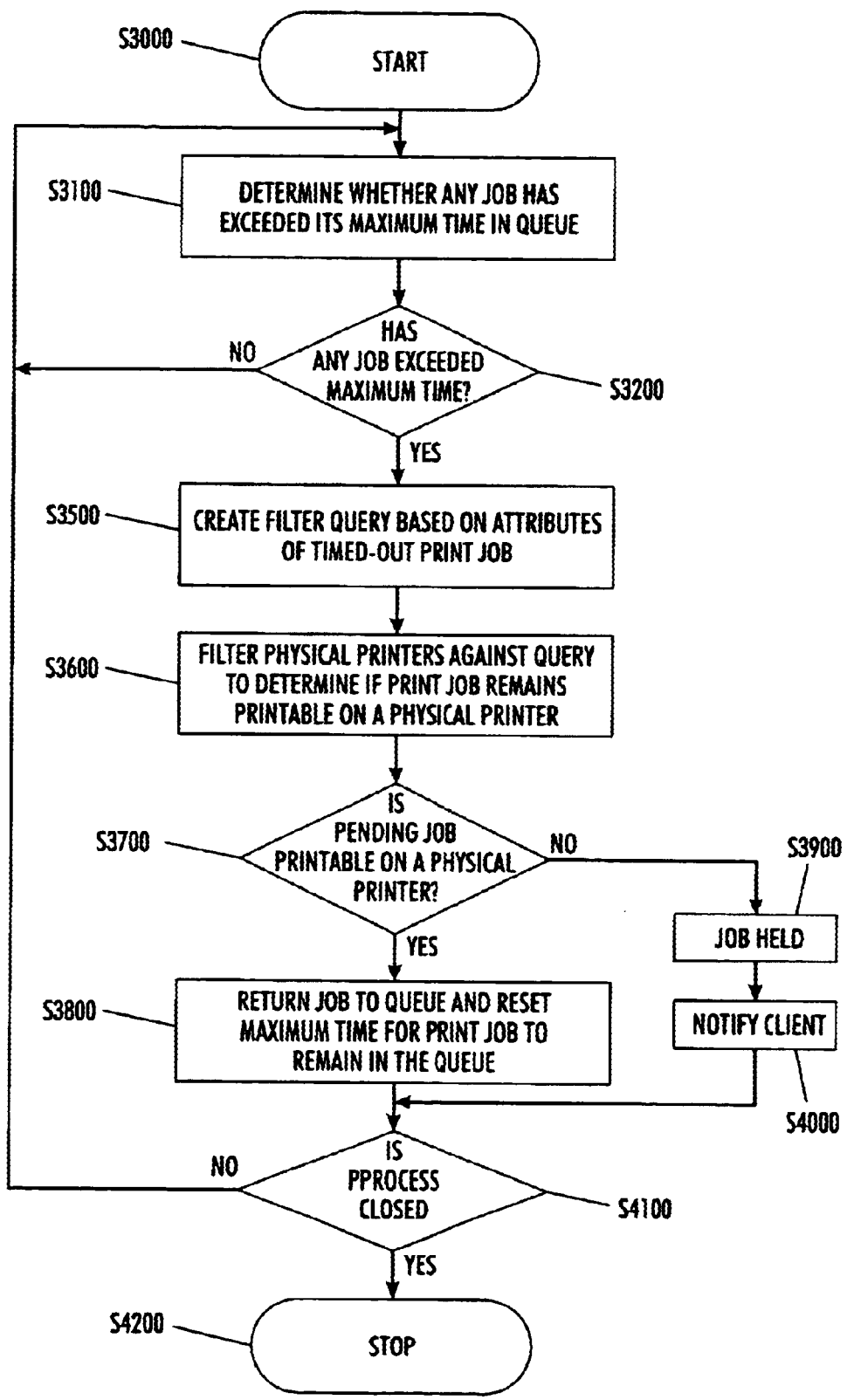
FIG. 10 is a flowchart outlining one method for re-evaluating old print jobs.

In another preferred embodiment of this invention, the network printing system 100 can include an optional time-out feature. FIG. 10 outlines one method for implementing this time-out feature. If the time-out feature is implemented, step S650 (shown in broken lines in FIG. 6) will be included when adding the print requests to the queue 414. In this case, instead of following control path L690 to step S700 after an OK is returned to the client in step S600, control path L610, indicated by the broken line, is followed to step S650. In step S650, a maximum time is set for the acceptable job to remain in the queue 414. The process then continues on the control path L660 to step S700.

In FIG. 10, beginning in step S3000, control continues to step S3100, where the server 410 determines whether any pending job has exceeded its maximum time in the queue 414 in which it has not been scheduled to a physical printer. If, in step S3200, no jobs have exceeded their maximum time in the queue 414, control returns to step S3100. However, in step S3100, if a job has exceeded its maximum time in the queue 414, control continues to step S3500.

In step S3500, a database query is created based on the attributes of the timed-out print job. Then, in step S3600, the query is run against the physical printers associated with the queue to determine if the print job is still printable on at least one of the physical printers 422 associated with the queue 414. If, in step S3700, the print job is still printable on at least one of the associated physical printers, control continues to step S3800. Otherwise, control jumps to step S3900.

In step S3800, the job is returned to the queue 414 and the maximum time for the print job to remain in the queue 414 is reset. Control then jumps to step S4100. In step S3900, because the print job is not printable on any of the physical printers 422 associated with the queue 414, the print job is held. Then, in step S4000, a notification message can be sent to the user who submitted the job, indicating that the print request can not be printed on any of the associated printers. Control then continues to step S4100.

In S4100, if the network printing system 100 has not been halted, control returns to step S3100. Otherwise, control continues to step S4200, where the system stops.

As shown in FIG. 2, the network printing system 100 is preferably implemented on a programmed general purpose computer. However, the network printing system 100 can also be implemented on a special purpose computer, a programmed microprocessor or microcontroller and peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flowcharts shown in FIGS. 6–9 can be used to implement the network printing system 100.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for distributing document printing among a plurality of printers in a network printing system, comprising:

receiving a print request from a client;

prior to determining a schedule for a print job corresponding to the print request and allocating parts of the print job to resources for completion of the print job, determining, without intervention from the client, whether the print request is acceptable and can be completed based on a comparison between print attributes of the request and attributes of the resources provided by the network printing system;

generating and storing the print job in a queue only when the print request is determined to be acceptable, and informing a client that the print request is acceptable prior to determining the schedule and allocating parts of the print job;

marking the print request as unprintable and not generating or storing the print job, determining the schedule and allocating parts of the print job if the print request is not determined to be acceptable; and printing the acceptable print job on an available printer of the plurality of printers.

2. The method of claim 1, wherein the print request defines at least one attribute of: paper size, joining, speed, simplex and duplex.

3. The method of claim 2, wherein at least one attribute of joining is at least one of stapling and binding.

4. The method of claim 1, wherein the method further comprises, after storing the acceptable print job in the queue, determining whether the acceptable print job is printable on the available printer based on at least one document and at least one attribute.

5. The method of claim 4, wherein determining whether the print job is printable comprises:

extracting print attributes from the acceptable print job; and comparing the acceptable print job attributes against attributes of the printers associated with the queue.

6. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only when the print request is determined to be acceptable, and informing a client that the print request is acceptable prior to determining the schedule and allocating parts of the print job;

marking the print request as unprintable and not generating or storing the print job, determining the schedule and allocating parts of the print job if the print request is not determined to be acceptable; and printing the acceptable print job on an available printer of the plurality of printers;

wherein:

the method further comprises, after storing the acceptable print job in the queue, determining whether the acceptable print job is printable on the available printer based on at least one document and at least one attribute; and determining whether the print request is acceptable comprises:

extracting print attributes from the print request, and comparing the print attributes against attributes of a logical printer representing one or more of the plurality of the printers of the network.

7. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only when the print request is determined to be acceptable, and informing a client that the print request is acceptable prior to determining the schedule and allocating parts of the print job;

marking the print request as unprintable and not generating or storing the print job, determining the schedule and allocating parts of the print job if the print request is not determined to be acceptable; and printing the acceptable print job on an available printer of the plurality of printers;

wherein:

the method further comprises, after storing the acceptable print job in the queue, determining whether the acceptable print job is printable on the available printer based on at least one document and at least one attribute; and determining whether the stored acceptable print job is printable on the available printer comprises:

formulating a database query based on the attributes of the available printer, and using the database query to filter the attributes of the available printer against the attributes of the acceptable print job.

8. A method for distributing document printing among a plurality of printers in a network printing system, comprising:

receiving a print request;
prior to determining a schedule for a print job corresponding to the print request and allocating parts of the print job to resources for completion of the print job, determining whether the print request is acceptable and can be completed based on the resources provided by the network printing system;
generating and storing the print job in a queue only when the print request is determined to be acceptable, and informing a client that the print request is acceptable prior to determining the schedule and allocating parts of the print job;
marking the print request as unprintable and not generating or storing the print job, determining the schedule and allocating parts of the print job if the print request is not determined to be acceptable; and
printing the acceptable print job on an available printer of the plurality of printers;
wherein:
the method further comprises, after storing the acceptable print job in the queue, determining whether the acceptable print job is printable on the available printer based on at least one document and at least one attribute; and
determining whether the print request is acceptable comprises:
extracting print attributes from the print request,
generating a database query of the print attributes, and
using the database query to filter the print attributes against attributes of the printers associated with the queue.

9. The method of claim 8, wherein determining whether the stored print job is printable on the available printer comprises:
formulating a second database query based on the attributes of the available printer; and
using the second database query to filter the attributes of the available printer against the attributes of the acceptable print job.

10. A method for distributing document printing among a plurality of printers in a network printing system, comprising:
receiving a print request;
prior to determining a schedule for a print job corresponding to the print request and allocating parts of the print job to resources for completion of the print job, determining whether the print request is acceptable and can be completed based on the resources provided by the network printing system;
generating and storing the print job in a queue only when the print request is determined to be acceptable, and informing a client that the print request is acceptable prior to determining the schedule and allocating parts of the print job;
marking the print request as unprintable and not generating or storing the print job, determining the schedule and allocating parts of the print job if the print request is not determined to be acceptable; and
printing the acceptable print job on an available printer of the plurality of printers;
wherein:
the method further comprises, after storing the acceptable print job in the queue, determining whether the acceptable print job is printable on the available printer based on at least one document and at least one attribute; and
determining whether the stored print job is printable on the available printer comprises:
formulating a database query based on the attributes of the available printer and
using the database query to filter the attributes of the available printer against the attributes of the acceptable print job.

11. A printing system that distributes documents among a plurality of printers, comprising:
a server that receives a print request from a client;
a database that contains attributes of the plurality of printers and print job attributes;
a first filter that determines, without intervention from the client and prior to determining a schedule for a print job corresponding to the print request and allocating parts of the print job to resources for completion of the print job, if the print request is acceptable and can be completed based on a comparison between print job attributes corresponding to print attributes of the print request and attributes of the resources provided by the printing system, and generates and stores the print job in a queue only when the print request is determined to be acceptable, and informs a client that the print request is acceptable prior to determining the schedule and allocating parts of the print job,
wherein if the print request is not acceptable, the server marks the print request as unprintable so that the print job is not generated or stored, the schedule is not determined and the parts of the print job are not allocated; and
a supervisor server that prints the acceptable print job on an available printer of the plurality of printers.

12. The printing system of claim 11, further comprising:
a second filter that determines whether the acceptable print job is printable on the available printer based on at least one document and at least one attribute.

13. The printing system of claim 12, wherein the server includes:
a spooler; and
a supervisor.

14. The printing system of claim 12, wherein the first filter comprises a database query based on at least one attribute of the print request.

15. The printing system of claim 14, wherein the second filter comprises a database query based on at least one attribute of the available printer.

16. The printing system of claim 12, wherein the second filter comprises a database query based on at least one attribute of the available printer.

17. A printing system that distributes documents among a plurality of output devices, comprising:
means for receiving print requests from clients;
first storing means for storing attributes of the plurality of output devices;
first determining means for determining, for a given print request, without client intervention and prior to determining a schedule for a print job corresponding to that print request and allocating parts of the print job to resources for completion of the print job, whether that print request is acceptable and can be completed based on a comparison between print attributes of that print request and attributes of the resources provided by the printing system, for generating and storing the print job in second storing means only if the print request is determined to be acceptable, and for informing a client that the print request is acceptable prior to determining the schedule and allocating parts of the print job, wherein if the print request is not acceptable, the first determining means marks the print request as unprintable so that the print job is not generated or stored, the schedule is not determined and parts of the print job are not allocated; and means for outputting the acceptable print job from the second storing means to an output device.

18. The printing system of claim 17, further comprising:

second determining means for determining whether the acceptable print job is printable on the output device based on at least one document and at least one attribute.

19. The printing system of claim 18, wherein the plurality of output devices includes at least one printer.

20. The printing system of claim 18, wherein the receiving and generating means includes:

a spooler; and a supervisor.

21. The printing system of claim 18, wherein the first determining means comprises querying means for querying the first storing means based on at least one attribute of the print job.

22. The printing system of claim 18, wherein the second storing means comprises a queue.

23. A printing system that distributes documents among a plurality of output devices, comprising:

means for receiving print requests;

first storing means for storing attributes of the plurality of output devices;

first determining means for determining, for a given print request, prior to determining a schedule for a print job corresponding to that print request and allocating parts of that print job to resources for completion of the print job, whether that print request is acceptable and can be completed based on the resources provided by the printing system, for generating and storing the print job in second storing means only if the print request is determined to be acceptable, and for informing a client that the print request is acceptable prior to determining the schedule and allocating parts of the print job, wherein, if the print request is not acceptable, the first determining means marks the print request as unprintable so that the print job is not generated or stored, the schedule is not determined, and parts of the print job are not allocated;

means for outputting the acceptable print job from the second storing means to an output device; and a second determining means for determining whether the acceptable print job is printable on the output device based on at least one document and at least one attribute;

wherein the first determining means comprises querying means for querying the first storing means based on at least one attribute of the print job, and the second determining means comprises second querying means for querying the second storing means based on at least one attribute of the output device.

24. A printing system that distributes documents among a plurality of output devices, comprising:

means for receiving print requests;

first storing means for storing attributes of the plurality of output devices;

first determining means for determining, for a given print request, prior to determining a schedule for a print job corresponding to that print request and allocating parts of that print job to resources for completion of the print job, whether that print request is acceptable and can be completed based on the resources provided by the printing system, for generating and storing the print job in second storing means only if the print request is determined to be acceptable, and for informing a client that the print request is acceptable prior to determining the schedule and allocating parts of the print job, wherein, if the print request is not acceptable, the first determining means marks the print request as unprintable so that the print job is not generated or stored, the schedule is not determined and parts of the print job are not allocated;

means for outputting the acceptable print job from the second storing means to an output device; and second determining means for determining whether the acceptable print job is printable on the output device based on at least one document and at least one attribute;

wherein the second determining means comprises querying means for querying the second storing means based on at least one attribute of the output device.

25. A method for distributing document printing among a plurality of printers in a network printing system, comprising:

receiving a request from a client;

prior to determining a schedule for a print job corresponding to the print request and allocating parts of the print job to resources for completion of the print job, determining, without intervention from the client, whether the print request is acceptable and can be completed based on a comparison between print attributes of the print request and attributes of the resources provided by the network printing system;

generating and storing the print job in a queue only if the print request is determined to be acceptable, wherein a client is informed that the print request is acceptable prior to determining the schedule and allocating parts of the print job;

marking the print request as unprintable if the print request is not acceptable, so that the print job is not generated or stored, the schedule is not determined and the parts of the print job are not allocated; and submitting the acceptable print job to a printer.

26. The method of claim 25, wherein the method further comprises, after storing the acceptable print job in the queue, determining whether the acceptable print job is printable on the printer based on at least one document and at least one attribute.

27. The method of claim 26, wherein determining whether the print request is acceptable comprises:

extracting print request attributes from the print request; and comparing the print request attributes against attributes of the printers.

28. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only if the print request is determined to be acceptable, wherein a client is informed that the print request is acceptable prior to determining the schedule and allocating parts of the print job;

marking the print request as unprintable if the print request is not acceptable, so that the print job is not generated or stored, the schedule is not determined and the parts of the print job are not allocated; and submitting the acceptable print job to a printer;

wherein:

the method further comprises, after storing the acceptable print job in the queue, determining whether the acceptable print job is printable on the printer based on at least one document and at least one attribute; and determining whether the print request is acceptable comprises:

extracting print request attributes from the print request, and comparing the print request attributes against attributes of a logical printer representing one or more of the plurality of printers of the network.

29. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only if the print request is determined to be acceptable, wherein a client is informed that the print request is acceptable prior to determining the schedule and allocating parts of the print job;

if the print request is not acceptable, marking the print request as unprintable so that the print job is not generated or stored, the schedule is not determined and parts of the print job are not allocated; and submitting the acceptable print job to a printer;

wherein:

the method further comprises, after storing the acceptable print job in the queue, determining whether the acceptable print job is printable on the printer based on at least one document and at least one attribute;

determining whether the print job is acceptable comprises:

extracting print job attributes from the print job, and comparing the print job attributes against attributes of the printers; and determining whether the acceptable print job is printable on the printer comprises:

formulating a database query based on the attributes of the printer, and using the database query to filter the attributes of the printer against the attributes of the acceptable print job in the queue.

30. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only if the print request is determined to be acceptable, wherein a client is informed that the print request is acceptable prior to determining the schedule and allocating parts of the print job;

if the print request is not acceptable, marking the print request as unprintable so that the print job is not generated or stored, the schedule is not determined and parts of the print job are not allocated; and submitting the acceptable print job to a printer;

wherein:

the method further comprises, after storing the acceptable print job in the queue, determining whether the acceptable print job is printable on the printer based on at least one document and at least one attribute; and determining whether the print request is acceptable comprises:

extracting print request attributes from the print request, generating a database query of the print request attributes, and using the database query to filter the print request attributes against the attributes of the printers associated with the queue.

31. The method of claim 30, wherein determining whether the acceptable print job is printable comprises:

formulating a second database query based on the attributes of the printer; and using the second database query to filter the attributes of the printer against the attributes of the acceptable print job in the queue.

32. A method for distributing document printing among a plurality of printers in a network printing system, comprising:

receiving a print request;

prior to determining a schedule for a print job corresponding to the print request and allocating parts of the print job to resources for completion of the print job, determining whether the print request is acceptable and can be completed based on the resources provided by the network printing system;

generating and storing the print job in a queue only if the print request is determined to be acceptable, wherein a client is informed that the print request is acceptable prior to determining the schedule and allocating parts of the print job;

if the print request is not acceptable, marking the print request as unprintable so that the print job is not generated or stored, the schedule is not determined and parts of the print job are not allocated; and submitting the acceptable print job to a printer;

wherein:

the method further comprises, after storing the acceptable print job in the queue, determining whether the acceptable print job is printable on the printer based on at least one document and at least one attribute; and determining whether the acceptable print job is printable comprises:

formulating a database query based on the attributes of the printer, and using the database query to filter the attributes of the printer against the attributes of the acceptable print job in the queue.

* * * * *